United States Patent
Brownlow et al.

(10) Patent No.: US 10,177,799 B2
(45) Date of Patent: Jan. 8, 2019

(54) MOUNT FOR HAND-HELD ELECTRONIC SCANNERS

(71) Applicant: Clarion Technologies, Inc., Holland, MI (US)

(72) Inventors: John Brownlow, Ada, MI (US); Gardner Klaasen, Ada, MI (US)

(73) Assignee: Clarion Technologies, Holland, MI (US)

( * ) Notice: Subject to any disclaimer, the term of this patent is extended or adjusted under 35 U.S.C. 154(b) by 0 days.

(21) Appl. No.: 15/698,112

(22) Filed: Sep. 7, 2017

(65) Prior Publication Data

US 2018/0069583 A1    Mar. 8, 2018

Related U.S. Application Data

(60) Provisional application No. 62/384,221, filed on Sep. 7, 2016.

(51) Int. Cl.
*H04B 1/3877* (2015.01)
*H04B 1/3888* (2015.01)
*H04B 1/3827* (2015.01)

(52) U.S. Cl.
CPC ........... *H04B 1/3877* (2013.01); *H04B 1/385* (2013.01); *H04B 1/3888* (2013.01); *H04B 2001/3861* (2013.01)

(58) Field of Classification Search
CPC .................... H04B 1/3888; H04B 2001/3861
USPC ............. 235/462.43, 462.45, 462.47, 472.01
See application file for complete search history.

(56) References Cited

U.S. PATENT DOCUMENTS

| | | | | |
|---|---|---|---|---|
| 5,349,497 A | * | 9/1994 | Hanson | B60R 11/02 16/422 |
| 5,763,865 A | * | 6/1998 | Swift | G06K 7/10881 235/383 |
| 5,828,052 A | * | 10/1998 | Reynolds | G06K 7/10881 235/472.01 |
| 6,708,887 B1 | * | 3/2004 | Garrett | G06F 1/1626 235/462.45 |
| 9,088,281 B2 | * | 7/2015 | Kohtz | H03K 17/94 |
| 9,436,226 B2 | * | 9/2016 | Chen | G06F 1/1654 |
| 2003/0222150 A1 | * | 12/2003 | Sato | G06F 1/1626 235/472.02 |
| 2007/0075142 A1 | * | 4/2007 | Bellows | G06F 1/1613 235/451 |

(Continued)

*Primary Examiner* — Paultep Savusdiphol
(74) *Attorney, Agent, or Firm* — Gardner Linn

(57) ABSTRACT

A computer mount is provided for securing a hand-held computer to a hand-held electronic scanner, such as a bar code or QR code scanner, or an RFID chip scanner. The computer mount includes an upper mount portion with a computer chamber for receiving and providing user access to the hand-held computer, and further includes a lower attachment portion for securing to the hand-held scanner. At least two upstanding sidewalls form the mount portion, optionally with a base wall extending therebetween, the sidewalls configured to engage in secure the hand-held computer. The attachment portion has at least two downwardly-extending sidewalls defining a scanner chamber at the lower attachment portion, the scanner chamber configured to receive a head of the hand-held scanner, while permitting normal functioning of the scanner.

20 Claims, 10 Drawing Sheets

(56) References Cited

U.S. PATENT DOCUMENTS

2014/0249941 A1\* 9/2014 Hicks ................ G06K 7/10821
 705/17
2016/0055357 A1\* 2/2016 Hicks ................ G06K 7/10881
 235/383

\* cited by examiner

MOUNT FOR HAND-HELD ELECTRONIC SCANNERS

CROSS REFERENCE TO RELATED APPLICATION

The present application claims the benefit of U.S. provisional application Ser. No. 62/384,221, filed Sep. 7, 2016, which is hereby incorporated herein by reference in its entirety.

FIELD OF THE INVENTION

The present invention relates to devices for supporting handheld computers.

BACKGROUND OF THE INVENTION

Handheld electronic scanners, such as bar code scanners or RFID chip scanners, have been implemented in retail environments. Such devices typically only function to scan bar codes or RFID chips within short range, such as approximately 1 foot. However, devices designed for retail use are generally unsuitable for other applications, such as in manufacturing or warehousing environments where it is not practical for users to place themselves within only one or two feet of an object to be scanned.

SUMMARY OF THE INVENTION

The present invention provides a computer mount for securing a hand-held computer to a hand-held electronic scanner. This permits the scanner to be used simultaneously with the computer, and permits wireless (or even wired) electronic communications between the scanner and the computer, such as to facilitate medium to long-range scanning or detection or capturing of visible indicia or radio frequency tags or the like, such as in a warehouse or manufacturing environment. The mount allows an extended range wireless (such as Bluethooth®) scanner to interface with a handheld computer, which in turn interfaces with an inventory management software package.

In one form of the present invention, a mount for securing a hand-held computer to a hand-held electronic scanner includes a mount portion defining a computer chamber for receiving the hand-held computer, and an attachment portion for securing to a head portion of the electronic scanner. The mount portion has at least two spaced-apart upstanding sidewalls on opposite sides of the computer chamber, which sidewalls are configured to engage respective opposite side portions of the hand-held computer. The attachment portion has at least two downwardly-extending sidewalls that are coupled to the respective upstanding sidewalls of the mount portion, and which cooperate to define the scanner cavity below the computer chamber. The attachment portion defines first and second open regions providing access to the scanner cavity, where the first open region receives a forward portion of the electronic scanner's head portion, and the second open region receives a handgrip portion of the electronic scanner.

According to one aspect, at least one of the upstanding sidewalls defines a recess or opening that permits access to a control input, sensor, or port along a corresponding one of the opposite side portions of the hand-held computer.

According to another aspect, the mount portion further includes upstanding forward and rearward end walls that engage respective forward and rearward end portions of the hand-held computer. Optionally, at least one of the upstanding forward and rearward end walls defines a recess or opening that permits access to a control input, sensor, or port along a corresponding one of the opposite side portions of the hand-held computer.

According to yet another aspect, a base wall is positioned between the computer chamber and the scanner cavity. The base wall includes opposite side portions or edge regions coupled to respective upstanding sidewalls and to respective downwardly-extending sidewalls. Optionally, the base wall includes a substantially planar upper surface that is substantially perpendicular to the upstanding sidewalls.

According to a further aspect, each of the downwardly-extending sidewalls has an arcuate and inwardly-curved lower portion that defines a lower edge. The lower edges of the downwardly-extending sidewalls cooperate to define at least a portion of the second open region. Optionally, each of the downwardly-extending sidewalls has an arcuate and inwardly-curved rear portion that defines a respective rear edge, where the rear edges of the downwardly-extending sidewalls abut one another at a rear end portion of the attachment portion. Optionally, the downwardly-extending sidewalls and a rear portion of the mount portion cooperate to define a third open region through which the scanner cavity is accessible above the rear edges of the downwardly-extending sidewalls.

According to a still further aspect, the downwardly-extending sidewalls have concave arcuate interior surfaces defining portions of the scanner cavity. Optionally, each of the arcuate interior surfaces of the downwardly-extending walls may include at least one inwardly-extending elongate projection, with the elongate projections are configured to engage outer surfaces of the head portion of the hand-held electronic scanner.

According to another aspect, the mount body includes first and second body portions, with the first body portion including a first of the upstanding sidewalls and a first of the downwardly-extending sidewalls, and with the second body portion including a second of the upstanding sidewalls and a second of the downwardly-extending sidewalls. Optionally, the first body portion and the second body portion are each unitarily formed.

According to still another aspect, the mount further includes a base wall between the computer chamber and the scanner cavity. The base wall includes an upper surface and opposite side portions coupled to respective upstanding sidewalls and to respective downwardly-extending sidewalls. The first body portion includes a first opposite side portions of the base wall and the second body portion includes a second opposite side portion of the base wall. The first and second opposite side portions of the base wall include respective middle edge portions. Optionally, the middle edge portion of the first side portion of the base wall includes an elongate ledge spaced below the upper surface, and the middle edge portion of the second side portion of the base wall includes an inwardly-projecting wall configured to engage the elongate ledge.

Thus, the computer mount enables a user to secure a hand-held computer to a hand-held electronic scanner, which facilitates use of the scanner and computer simultaneously, and thereby facilitates medium to long-range scanning or detection or capturing of visible indicia or radio frequency tags or the like, and electronic communications with an inventory management software package, such as in a warehouse or a manufacturing environment.

DESCRIPTION OF THE PREFERRED EMBODIMENTS

Figure 1:
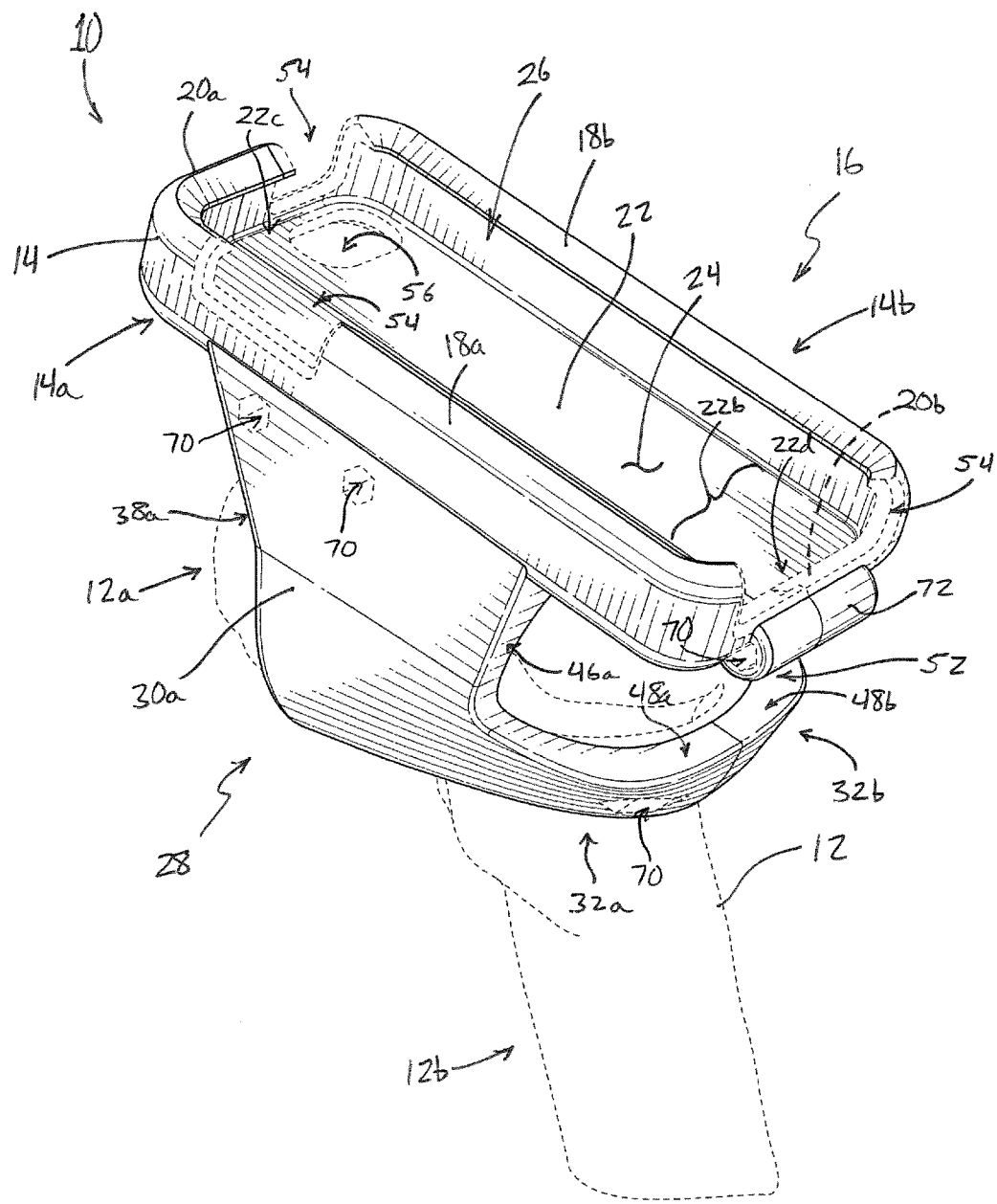
FIG. 1 is a rear perspective view of a mount in accordance with the present invention, and also depicting a hand-held electronic scanner in phantom lines.
Figure 2:
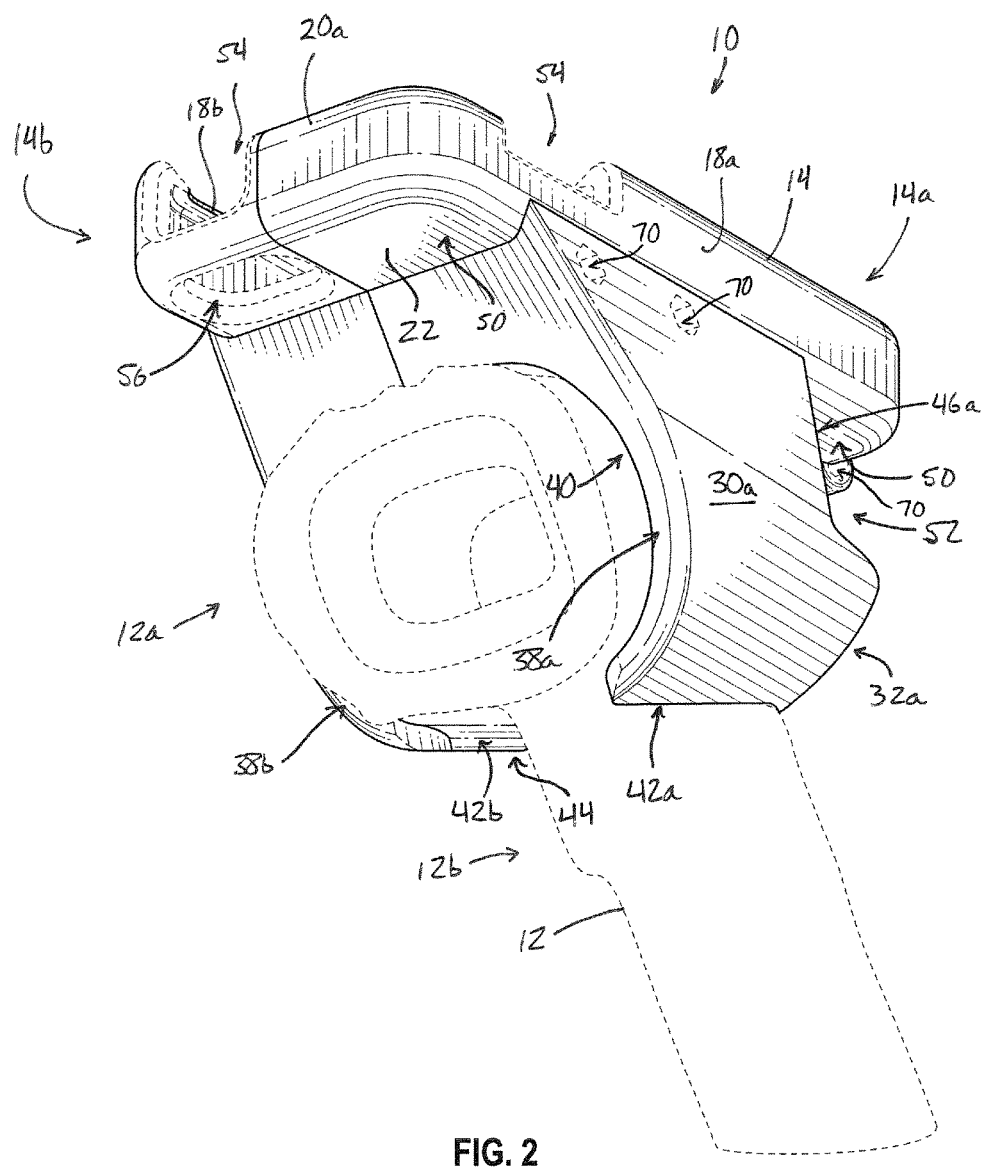
FIG. 2 is a front perspective view of the mount and scanner of FIG. 1.

Referring now to the drawings and the illustrative embodiments depicted therein, a mount 10 is provided for securing a hand-held computer (not shown) to a hand-held electronic scanner 12, such as a bar code scanner, an RFID chip scanner, or the like (FIGS. 1 and 2). This facilitates cooperative operation of medium to long range enabled scanners with a hand-held computer, which may be in wireless electronic communication with both the scanner and with a remotely located computer database, such as in a warehouse or a manufacturing facility. This arrangement enables workers to conduct optical or radio-frequency (e.g., RFID) scanning operations of bar codes, QR codes, or other computer-readable markings or indicia, or of RFID chips or other radio frequency technologies, across long distances. For example, a worker in a warehouse or manufacturing environment can use the mount 10 to keep a hand-held computer in a convenient and accessible location, such as atop the hand-held scanner 12, so that the scanner 12 can be grasped by its handle 12b and its scanning feature(s) operated in a normal manner, while providing substantially full view and access to the hand-held computer's screen, permitting the worker's other hand to manipulate the controls and functions of the screen.

Mount 10 includes a body 14 assembled from a left body portion 14a that mates with a right body portion 14b, such as shown in FIGS. 1 and 2. An upper mount portion 16 of body 14 is configured to receive a hand-held computer, such as a smart phone, a tablet computer, or the like. Upper mount portion 16 includes a pair of upstanding sidewalls 18a, 18b, a forward end wall 20a and a rearward end wall 20b, and a base wall 22 having a substantially planar upper surface 24, all of which cooperate to define a computer chamber 26. Sidewalls 18a, 18b and forward and rearward end walls 20a, 20b are configured to engage the hand-held computer at respective side and end regions thereof, and are provided with overhanging lips or flanges so as to retain the computer in the computer chamber 26. Optionally, sidewalls 18a, 18b and forward and rearward end walls 20a, 20b may be flexible and resilient to permit the computer to be inserted and removed by displacing at least some of the upstanding walls. However, because of the body's two-piece construction, substantially rigid material may be used so that at least partial separation of the left and right body portions 14a, 14b is required to install or remove a hand-held computer in the chamber 26.

Figure 6:
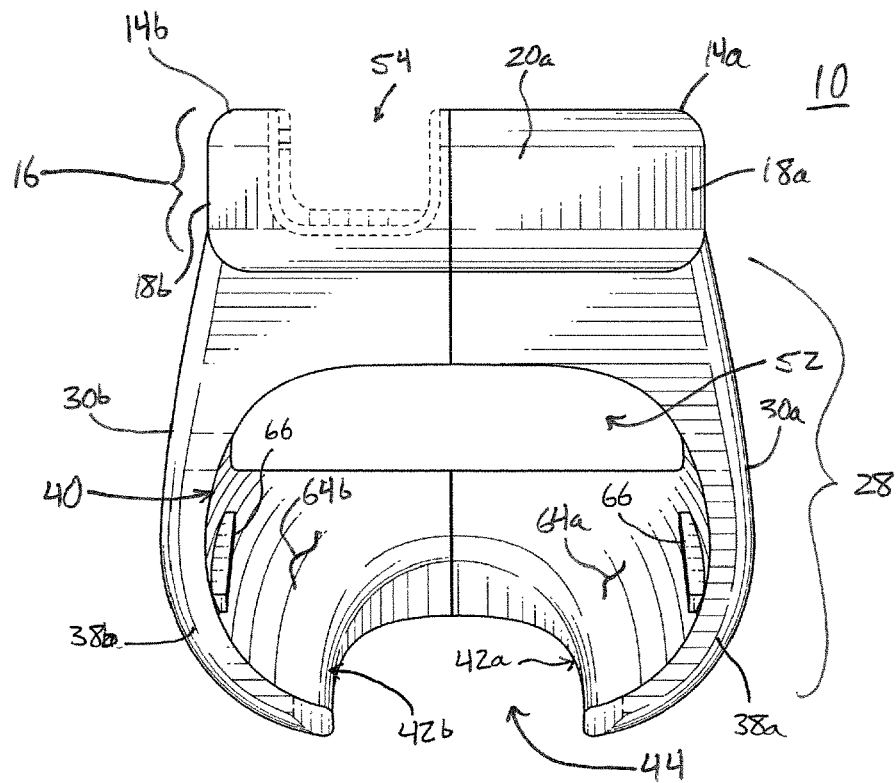
FIG. 6 is a front elevation of the mount of FIG. 1.
Figure 7:
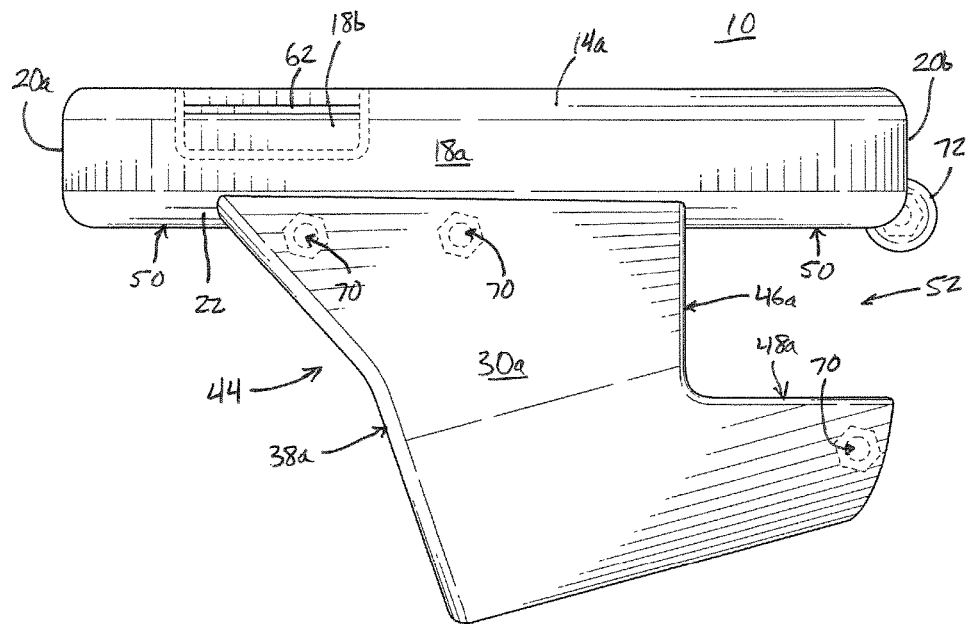
FIG. 7 is a left side elevation of the mount.
Figure 8:
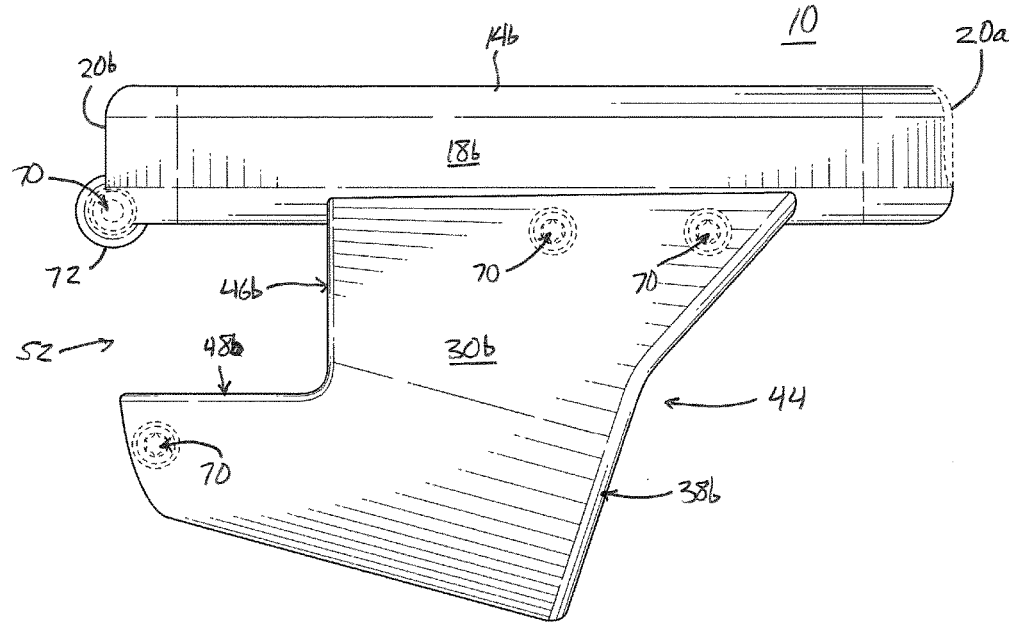
FIG. 8 is a right side elevation of the mount.

Body 14 further includes a lower attachment portion 28 configured to attach to an upper head portion 12a of hand-held scanner 12. Lower attachment portion 28 includes a pair of downwardly-extending sidewalls 30a, 30b that are substantially aligned with respective ones of the upstanding sidewalls 18a, 18b, extending downwardly from the sidewalls and from base wall 22 (FIGS. 1, 2 and 6). Downwardly-extending sidewalls 30a, 30b curve inwardly toward one another in the direction of their lower extremities, in order to partially enclose a lower region of the scanner's upper head portion 12a (FIG. 2). In addition, downwardly-extending sidewalls 30a, 30b include respective rearwardly-extending wall portions 32a, 32b that curve inwardly toward one another and define rear edges 34a, 34b (FIGS. 3 and 4) that meet in abutment at a rear end region of attachment portion 28, such as shown in FIGS. 1, 5, 6 and 10. Downwardly-extending sidewalls 30a, 30b cooperate to define a scanner cavity 36, such as shown in FIGS. 5-8 and 10. A left side scanner cavity portion 36a may be seen with reference to FIG. 3, and a right side scanner cavity portion 36b may be seen with reference to FIG. 4.

Downwardly-extending sidewalls 30a, 30b define respective forward edges 38a, 38b that are spaced apart from one another, and which cooperate to define a first or forward open region 40 providing access to scanner cavity 36, and providing space for a forward portion of scanner head 12a to protrude from the scanner cavity 36, such as shown in FIG. 2. Downwardly-extending sidewalls 30a, 30b further define respective inwardly-directed lower edges 42a, 42b that are spaced apart from one another, and which cooperate to define a second or lower open region 44 that also provides access to scanner cavity 36, and which provides space for the handle or grip portion 12b of scanner 12 to protrude from the scanner cavity 36. Downwardly-extending sidewalls 30a, 30b also define respective rear edges 46a, 46b, which transition, at their lower ends, to respective upper edges 48a, 48b of the rearwardly-extending wall portions 32a, 32b, such as shown in FIG. 1. Rear edges 46a, 46b cooperate with upper edges 48a, 48b and a lower surface 50 of base wall 22 to define a third or rearward open region 52 providing access to scanner cavity 36, such as shown in FIGS. 2 and 5-8. Rearward open region 52 may facilitate manually pushing the scanner head 12a out of scanner cavity 26 during disassembly, and may also facilitate the flow of cooling air around the scanner head 12a.

In the illustrated embodiment, left upstanding sidewall 18a cooperates with forward end wall 20a and rearward end wall 20b to define respective recesses 54 that enable a user to access a control input or port in a side or end region of the hand-held computer, or that provide clearance for a sensor of the hand-held computer. For example, hand-held computer control inputs may include volume/zoom controls and power on/off, ports may include power or data or audio ports, and sensors may include microphones, cameras, chip readers, and the like. In addition, a through-opening 56 may be provided in base wall 22, near forward end wall 20a, such as to permit the use of a camera or other sensor of the hand-held computer, when it is mounted in computer chamber 26. In FIGS. 1, 2 and 5-12, phantom lines are used to indicate recesses 54 and opening 56 to indicate that these features may be located substantially anywhere along the upper mount portion 16, and sized and shaped to accommodate different types of hand-held computers. However, it will also be appreciated that the overall shape and the various dimensions of upper mount portion 16, and of lower attachment portion 28, may be selected according to the dimensions and the ports and/or sensors associated with the hand-held computers and the hand-held scanner 12 with which a particular mount is designed to be compatible, without departing from the spirit and scope of the present invention. For example, and with reference to FIGS. 3 and 4, phantom lines are omitted in showing another exemplary embodiment having somewhat different recesses and openings formed in the sidewalls and the end walls, as compared to the other drawings.

Figure 9:
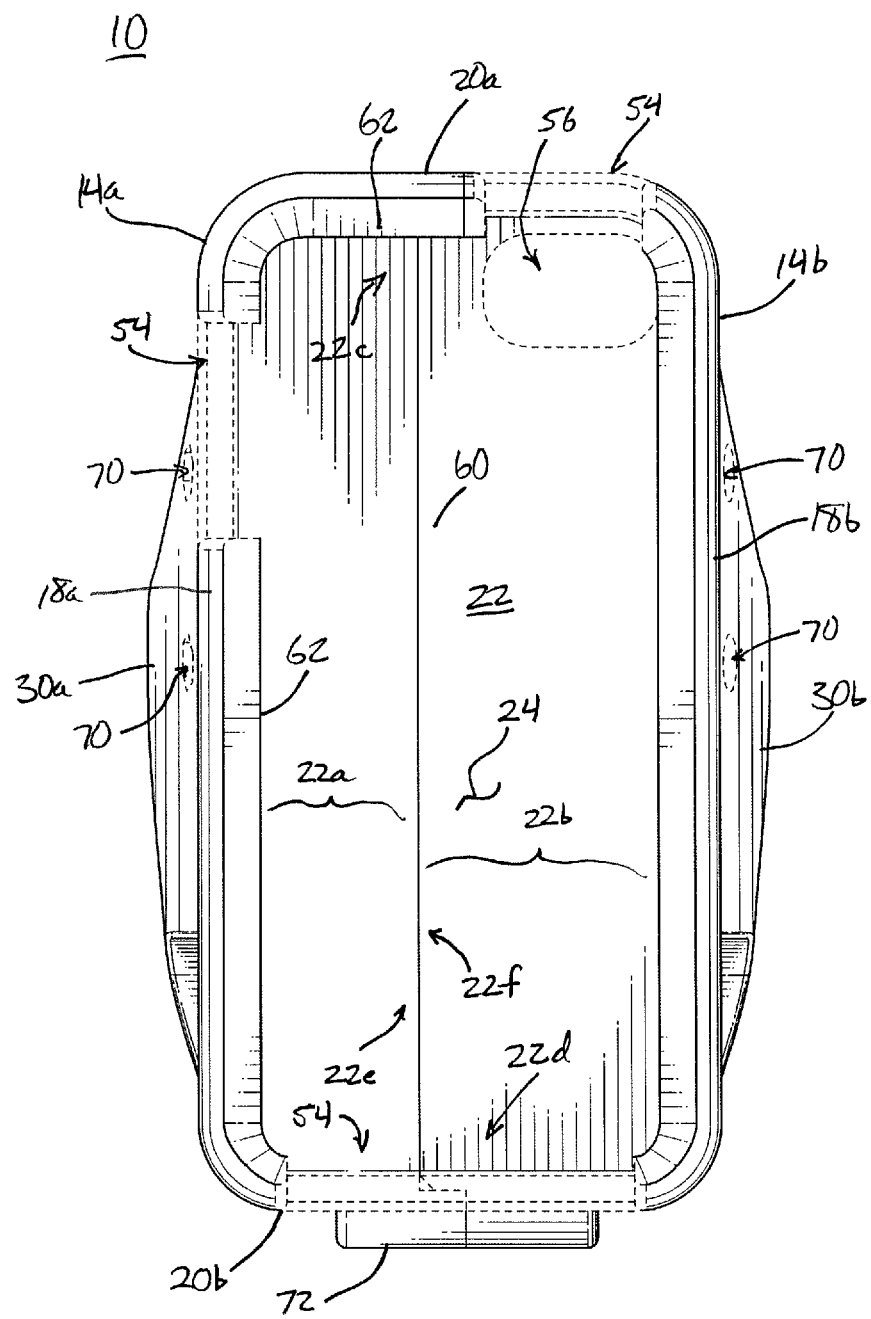
FIG. 9 is a top plan view of the mount.
Figure 10:
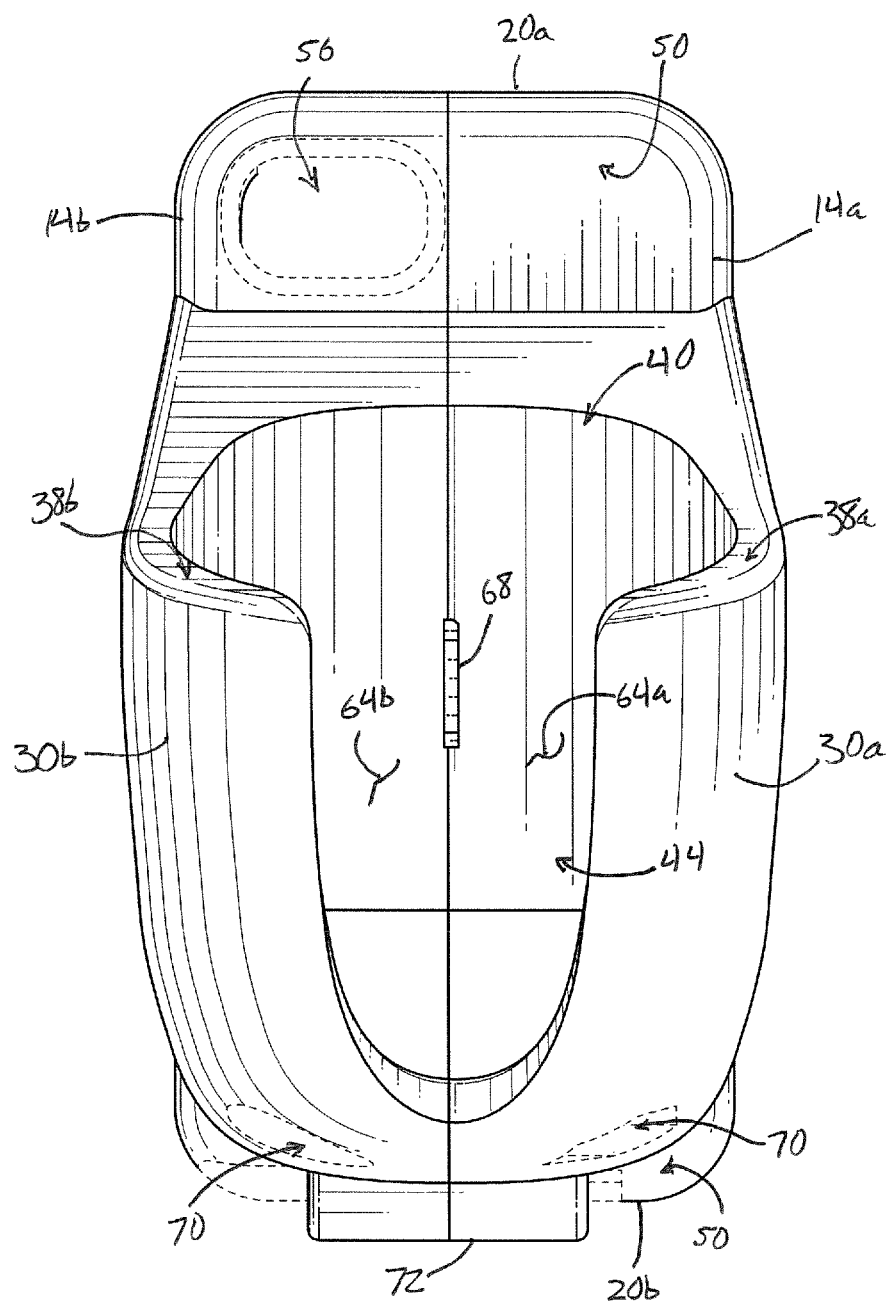
FIG. 10 is a bottom plan view of the mount.
Figure 11:
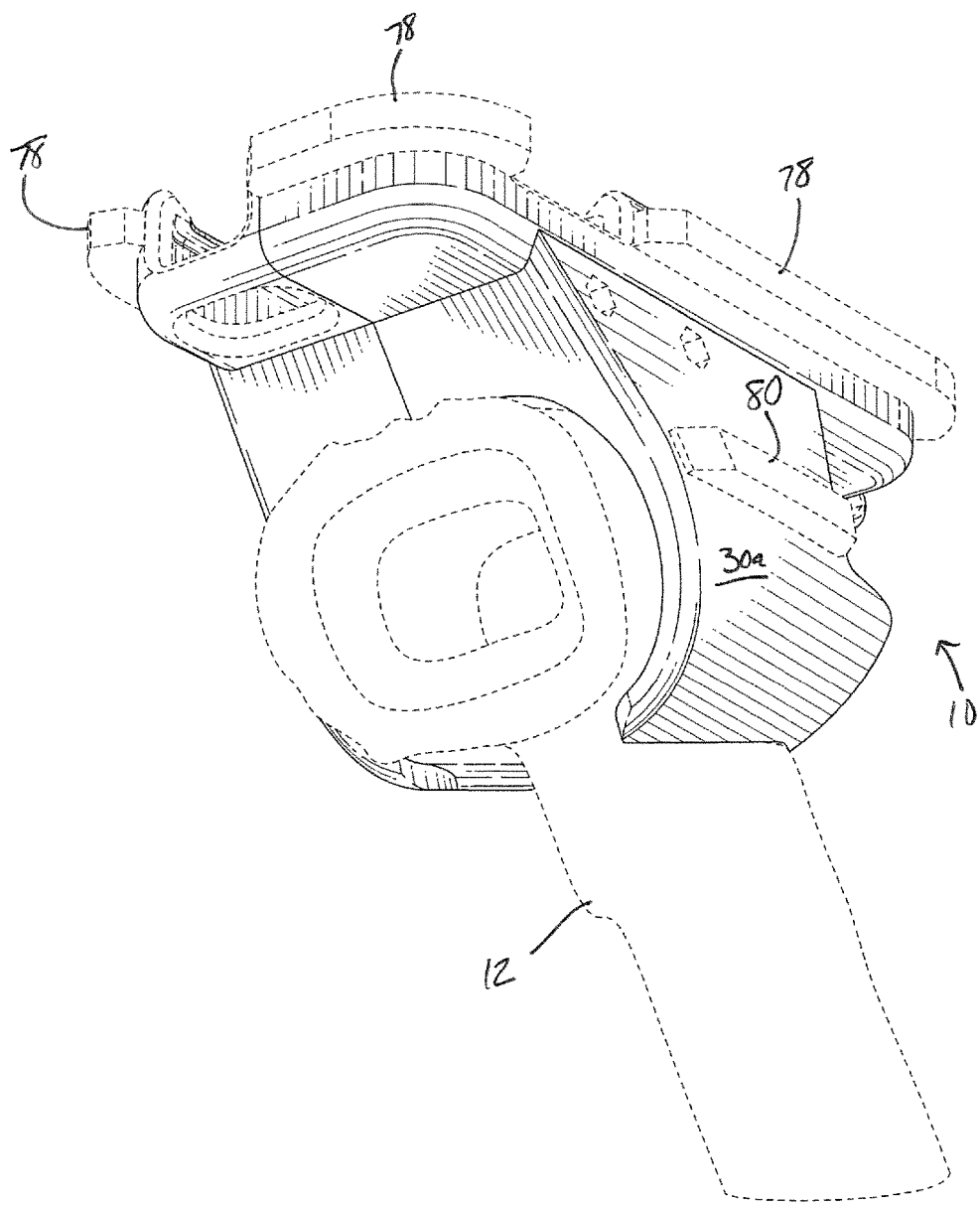
FIG. 11 a front perspective view of another mount in accordance with the present invention, and also depicting a hand-held electronic scanner in phantom lines.
Figure 12:
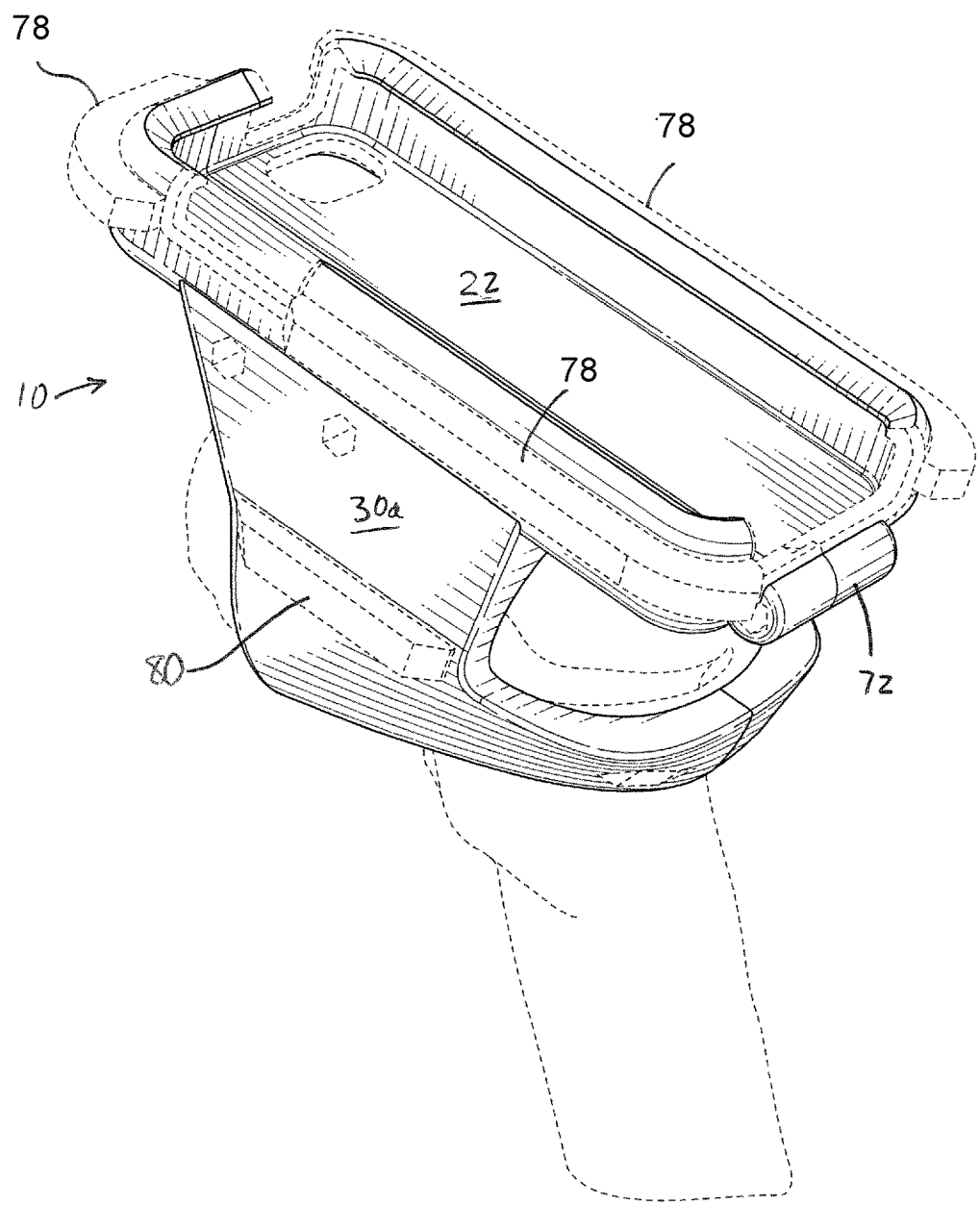
FIG. 12 is a rear perspective view of the mount and scanner of FIG. 11.

Base wall 22 includes a left side portion or region 22a formed by left body portion 14a (FIGS. 3, 9 and 10), and a right side portion or region 22b formed by right body portion 14b (FIGS. 1, 9 and 10). Left and right upstanding sidewalls 18a, 18b extend upwardly from the upper surface 24 at left and right side portions 22a, 22b, respectively. Base wall 22 further includes a forward end portion or region 22c and a rearward end portion or region 22d formed by both left and right body portions 14a, 14b, with forward and rearward upstanding end walls 20a, 20b extending upwardly from the upper surface 24 at forward and rearward end portions 22c, 22d, respectively. Like left and right upstanding sidewalls 18a, 18b, left and right downwardly-extending sidewalls 30a, 30b extend downwardly from respective ones of the left and right upstanding sidewalls 18a, 18b, and from lower surface 50 of base wall 22.

Figure 3:
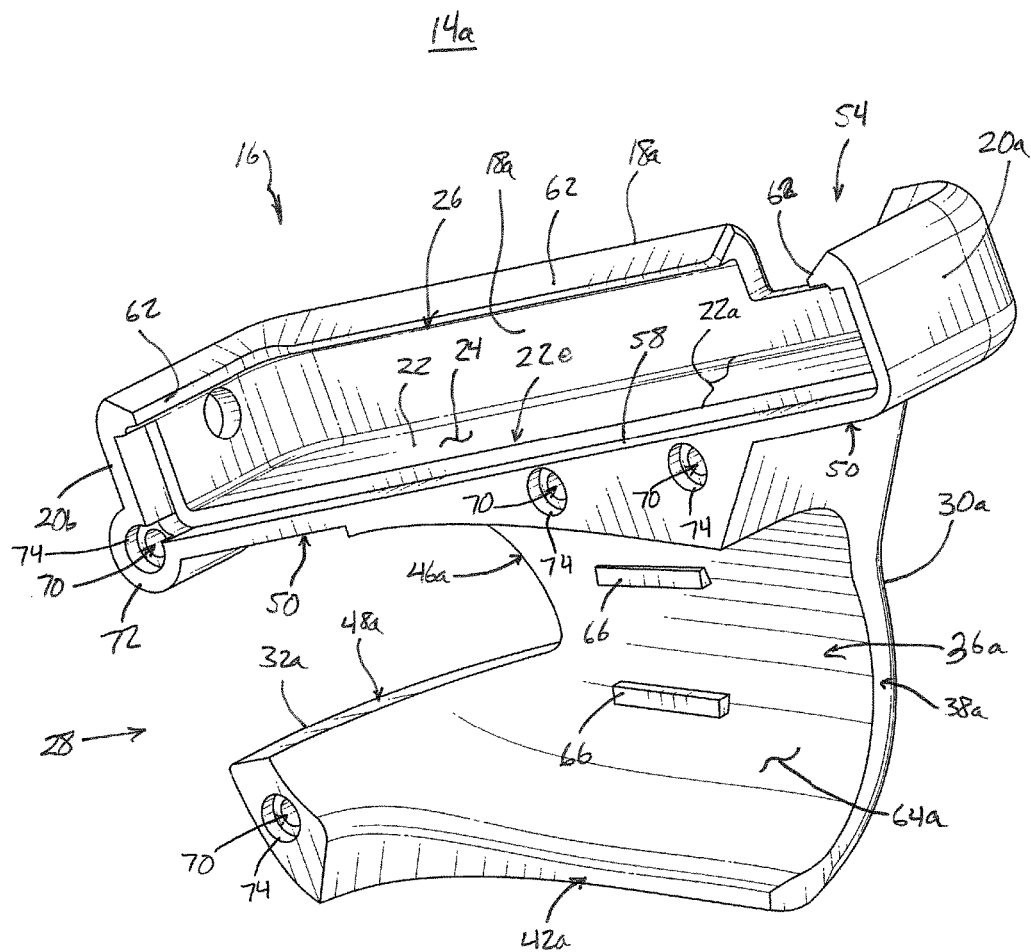
FIG. 3 is a perspective view of a left side portion of the mount of FIG. 1.
Figure 4:
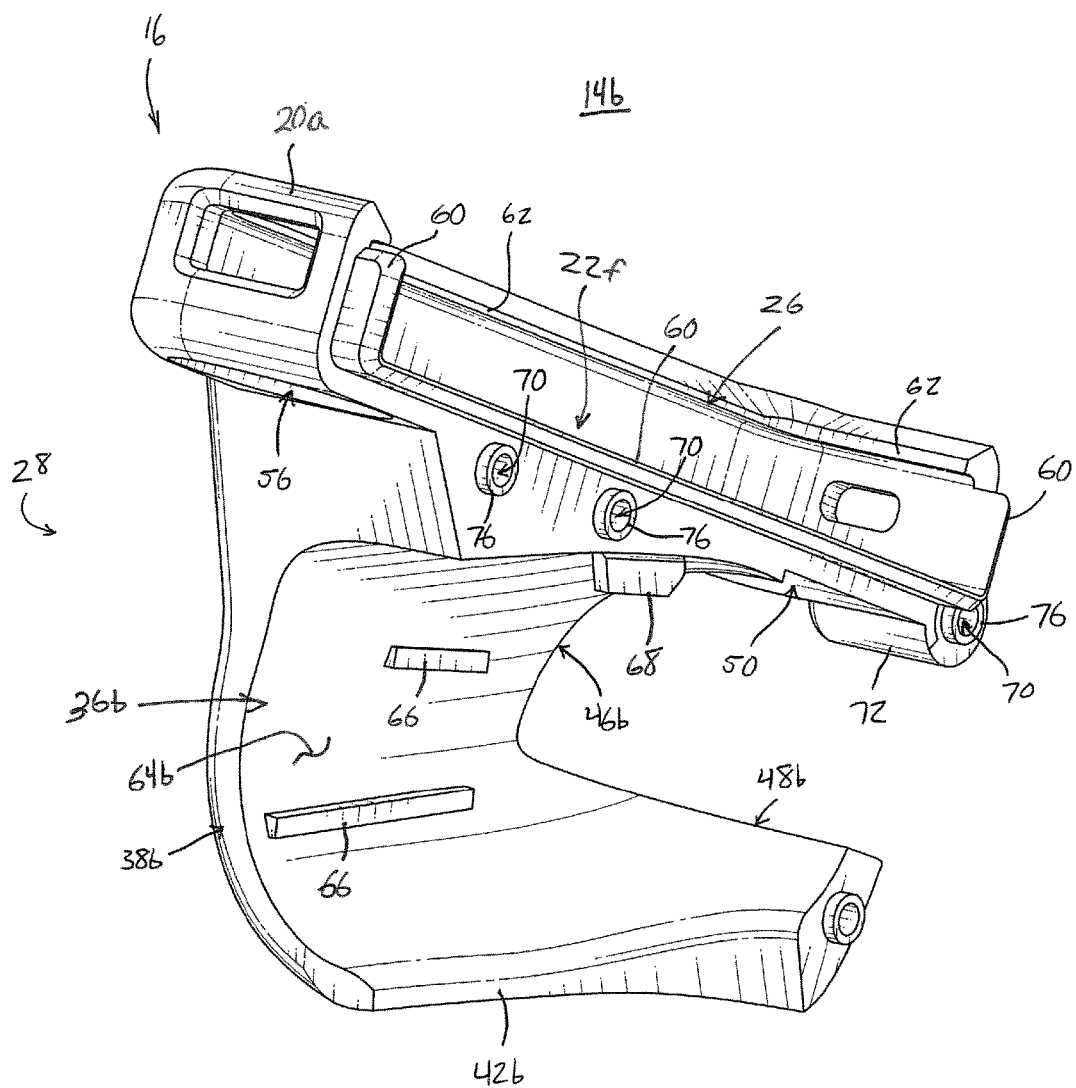
FIG. 4 is a front perspective view of a right side portion of the mount of FIG. 1.
Figure 5:
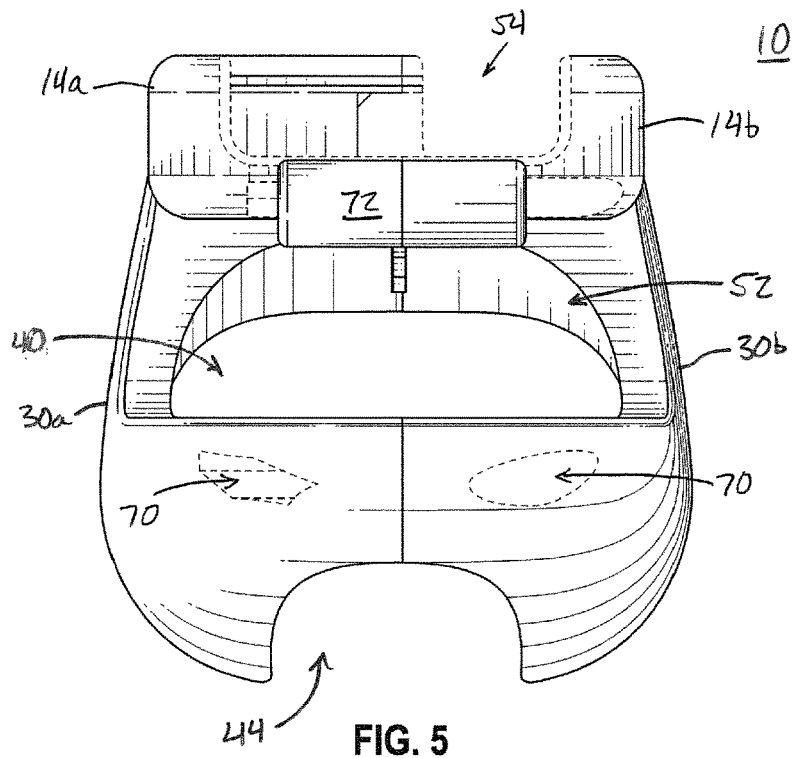
FIG. 5 is a rear elevation of the mount of FIG. 1.

Referring now to FIGS. 3 and 4, left body portion 14a (FIG. 3) includes approximately one half of base wall 22, which terminates along an inboard or middle edge region 22e that defines an elongate ledge 58, which is spaced below the planar upper surface 24 of base wall 22. Right body portion 14b (FIG. 4) includes a corresponding mating feature in the form of an inwardly-projecting elongate wall 60 that extends in a cantilever manner along an inboard or middle region 22f of the base wall portion 22 formed by right body portion 14b. Elongate ledge 58 and elongate wall 60 both include respective upwardly-extending portions formed in the forward and rearward end walls 20a, 20b, such as shown in FIGS. 3 and 4. Elongate ledge 58 and elongate wall 60 are correspondingly sized and shaped to slide together during assembly of mount 10, with elongate wall 60 overlying elongate ledge 58. This engagement facilitates alignment of the left and right body portions 14a, 14b during assembly, and may provide an initial friction-fit and temporary attachment of the body portions together before fasteners are used to complete the assembly, as described below.

In FIGS. 3 and 4, it can be seen that upstanding sidewalls 18a, 18b and upstanding end walls 20a, 20b define respective inwardly-directed flanges 62 that define the upper extent of computer chamber 26. When body portions 14a, 14b are assembled together, inwardly-directed flanges 62 may form a substantially continuous rim or lip surrounding computer chamber 26, except where interrupted by one or more recesses 54, to retain a hand-held computer at the chamber 26 defined by upper mount portion 16. Flanges 62 may be made from a substantially rigid material, or may be a more resilient, flexible material, as desired. Because the mount of the illustrated embodiment is assembled from separate left and right body portions 14a, 14b, it will be appreciated that a hand-held computer may be inserted into computer chamber 26 during assembly, and does not require deflecting the sidewalls 18a, 18b and/or end walls 20a, 20b, or the associated flanges 62, to force a hand-held computer into the chamber 26 from above.

Each downwardly-extending sidewall 30a, 30b of lower attachment portion 28 has a respective inwardly-facing concave arcuate interior surface 64a, 64b that defines scanner cavity portions 36a, 36b, such as shown in FIGS. 3 and 4. Arcuate interior surfaces 64a, 64b are bounded between respective ones of forward edges 38a, 38b, inwardly-directed lower edges 42a, 42b, and upper edges 48a, 48b, with arcuate interior surfaces 64a, 64b abutting or lying in close proximity to one another at a downwardly-facing upper region, directly below the inboard or middle edge regions 22e, 22f of base wall 22. In the illustrated embodiment, each arcuate interior surface 64a, 64b includes two elongate projections 66 for engaging outer surfaces of the hand-held scanner's head portion 12a. Because downwardly-extending sidewalls 30a, 30b would typically be made from a somewhat flexible, resilient material, elongate projections 66 help to ensure that head portion 12a is held tightly in scanner cavity 36, upon tightening of assembly fasteners that secure body portions 14a, 14b together. Additional projections, such as a downwardly-facing projection 68 at the upper central region of arcuate interior surface 64b (FIG. 4) may be provided, as desired, for the same purpose as elongate projections 66. These projections 66, 68 also permit at least limited cooling airflow around the scanner head portion 12a.

As noted above, left body portion 14a is secured to right body portion 14b using threaded fasteners (not shown). Respective fastener bores 70 are formed or established in each body portion 14a, 14b for this purpose. In the illustrated embodiment, a partially-cylindrical barrel 72 is formed at a lower-rear edge of upper mount portion 16, where rearward end wall 20b meets rearward end portion 22d of base wall 22 (FIGS. 1, 3-4 and 7-10). Barrel 72 provides additional material and strength to receive a fastener at the fastener bore 70 (FIGS. 3, 4 and 8) formed therein. Additional fastener bores 70 are provided in rearward-extending wall portions 32a, 32b, and in the base wall 22, between upper surface 24 and the upper regions of arcuate interior surfaces 64a, 64b. Left body portion 14a defines a cylindrical countersink bore 74 at each fastener bore 70 (FIG. 3), and right body portion 14b has a hollow cylindrical boss 76 formed at each corresponding fastener bore 70 (FIG. 4). Countersink bores 72 receive respective cylindrical bosses 76 upon initial assembly of body portions 14a, 14b, to further insure alignment and initial frictional engagement of the body portions to one another, prior to insertion and tightening of the threaded fasteners that secure the body portions together.

Each body portion 14a, 14b may be made from substantially any suitable material, including injection-molded resinous plastic or polymeric material. Optionally, each body portion 14a, 14b may be unitarily formed in a single mold, from a single injectable material, or from two or more different injectable materials having different material properties. For example, upper mount portion 16 may be molded from a substantially rigid and tough material, while lower attachment portion 28 may be a more flexible and resilient material, and in particular, elongate projections 66 and downwardly-facing projection 68 may be made from material having still-higher flexibility or compressibility, and exhibiting higher coefficients of friction to facilitate securing the scanner head portion 12a in scanner cavity 36.

Optionally, a plurality of outwardly-extending guards or bumpers may be provided along exterior surfaces of the mount 10, such as to improve the durability of the mount and to reduce shock loads (maximum G-forces) imparted to the hand-held computer and hand-held scanner 12 if they are dropped or bumped into other objects. For example, and with reference to FIGS. 11 and 12, mount 10 includes a set of upper side bumpers 76 disposed around most of the exterior perimeter of upper mount portion 16, except where recesses 54 are present. In addition, a pair of lower side bumpers 78 (only one of which is visible in each of FIGS. 11 and 12) extend outwardly from respective exterior surfaces of the downwardly-extending sidewalls 30a, 30b. In addition to improving shock-resistance, side bumpers 76, 78 may be made of a higher friction material, such as rubber or rubber-like material, to reduce the likelihood that mount 10 will slide along a given surface, such as a sloped desk or the like, when the mount 10 is placed on its side during non-use.

Although mount 10 is described herein as a mechanical device for mounting a hand-held computer to a compatible hand-held scanner 12, it is further envisioned that the mount may be fitted with electronics to facilitate electronic communications between the hand-held computer and the hand-held electronic scanner, or between the hand-held computer and a remote wireless transceiver (such as may be associated with a work area and a warehouse or manufacturing facility), or between the hand-held electronic scanner and a remote wireless transceiver, such as via Bluetooth, Near Field Communication (NFC), or WiFi protocols, for example. In that case, the mount's body may be modified to accommodate electronics, such as by providing a substantially enclosed interior chamber disposed between computer chamber 26 and scanner cavity 36. Such electronics may be inserted into respective interior chamber portions of the two body portions during assembly of the mount, and one or more openings may be provided to the interior chamber, to accommodate charging and/or data cords, or to accommodate controls for the electronics.

Accordingly, the computer mount of the present invention, for securing to a hand-held electronic scanner, facilitates simultaneous use of a scanner with medium to long-range communications and/or detection or capturing of visible indicia or radio frequency tags or the like, and wireless communications of the electronic data, and a single hand-held unit that can be supported in one hand using the handgrip of the hand-held scanner. The computer mount may be particularly well-suited to working environments where longer-range scanning and/or wireless electronic communications are desired, such as in manufacturing environments or warehouses. When a hand-held computer is mounted to a scanner in this manner, the scanner remains fully functional in a conventional manner, and the hand-held computer may be controlled with the operator's other hand, also in a substantially conventional manner.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A mount for securing a hand-held computer to a hand-held electronic scanner, said mount comprising:
    a body having a mount portion for receiving the hand-held computer, and an attachment portion for engaging the hand-held electronic scanner;
    said mount portion having at least two spaced-apart upstanding sidewalls defining a computer chamber therebetween and configured to engage respective opposite side portions of the hand-held computer; and
    said attachment portion having at least two downwardly-extending sidewalls coupled to respective ones of said upstanding sidewalls and cooperating to define a scanner cavity for receiving a head portion of the hand-held electronic scanner;
    wherein said attachment portion defines first and second open regions through which said cavity is accessible between said downwardly-extending sidewalls, said first open region is configured to receive a forward portion of the head portion of the hand-held electronic scanner, and said second open region is configured to receive a handgrip portion of the hand-held electronic scanner.

2. The mount of claim 1, wherein at least one of said upstanding sidewalls defines a recess or opening configured to permit access to a control input or sensor or port disposed along a corresponding one of the opposite side portions of the hand-held computer.

3. The mount of claim 1, wherein said mount portion further comprises upstanding forward and rearward end walls configured to engage respective forward and rearward end portions of the hand-held computer.

4. The mount of claim 3, wherein at least one of said upstanding forward and rearward end walls defines a recess or opening configured to permit access to a control input or sensor or port disposed along a corresponding one of the opposite side portions of the hand-held computer.

5. The mount of claim 1, further comprising a base wall disposed between said computer chamber and said scanner cavity, wherein said base wall comprises opposite side portions coupled to respective ones of said upstanding sidewalls and to respective ones of said downwardly-extending sidewalls.

6. The mount of claim 5, wherein said base wall comprises a substantially planar upper surface that is substantially perpendicular to said upstanding sidewalls.

7. The mount of claim 1, wherein each of said downwardly-extending sidewalls has an arcuate and inwardly-curved lower portion that defines a respective lower edge, wherein said lower edges of said downwardly-extending sidewalls cooperate to define at least a portion of said second open region.

8. The mount of claim 7, wherein each of said downwardly-extending sidewalls has an arcuate and inwardly-curved rear portion that defines a respective rear edge, wherein said rear edges of said downwardly-extending sidewalls are in abutment at a rear end portion of said attachment portion.

9. The mount of claim 8, wherein said downwardly-extending sidewalls and a rear portion of said mount portion cooperate to define a third open region through which said cavity is accessible above said rear edges of said downwardly-extending sidewalls.

10. The mount of claim 1, wherein said downwardly-extending sidewalls comprise concave arcuate interior surfaces defining portions of said scanner cavity.

11. The mount of claim 10, wherein each of said arcuate interior surfaces of said downwardly-extending walls comprises at least one elongate projection extending inwardly therefrom, wherein said elongate projections are configured to engage outer surfaces of the head portion of the hand-held electronic scanner.

12. The mount of claim 1, wherein said body comprises first and second body portions, wherein said first body portion comprises a first of said upstanding sidewalls and a first of said downwardly-extending sidewalls, and wherein said second body portion comprises a second of said upstanding sidewalls and a second of said downwardly-extending sidewalls.

13. The mount of claim 12, wherein each of said first body portion and said second body portion is unitarily formed.

14. The mount of claim 12, further comprising a base wall disposed between said computer chamber and said scanner cavity, wherein said base wall comprises an upper surface and opposite side portions coupled to respective ones of said upstanding sidewalls and to respective ones of said downwardly-extending sidewalls, wherein said first body portion comprises a first of said opposite side portions of said base wall and said second body portion comprises a second of said opposite side portions of said base wall, and wherein said first and second opposite side portions of said base wall comprise respective middle edge portions.

15. The mount of claim 14, wherein said middle edge portion of said first side portion of said base wall comprises an elongate ledge spaced below said upper surface, and said middle edge portion of said second side portion of said base wall comprises an inwardly-projecting wall configured to engage said elongate ledge.

16. A mount for securing a hand-held computer to a hand-held electronic scanner, said mount comprising:
- a body having a mount portion for receiving the hand-held computer, and an attachment portion for engaging the hand-held electronic scanner;
- said mount portion having a pair of spaced-apart upstanding sidewalls defining a computer chamber therebetween and configured to engage respective opposite side portions of the hand-held computer;
- said attachment portion having a pair of downwardly-extending sidewalls each unitarily formed with respective ones of said upstanding sidewalls and said downwardly-extending sidewalls cooperating to define a scanner cavity for receiving a head portion of the hand-held electronic scanner;
- a base wall disposed between said computer chamber and said scanner cavity, wherein said base wall comprises an upper surface and opposite side portions coupled to respective ones of said upstanding sidewalls and to respective ones of said downwardly-extending sidewalls;
- wherein said attachment portion defines at least three open regions through which said cavity is accessible between said downwardly-extending sidewalls, said open regions comprising:
  - a forward open region configured to receive a forward portion of the head portion of the hand-held electronic scanner;
  - a lower open region configured to receive a handgrip portion of the hand-held electronic scanner; and
  - a rearward open region opposite said forward open region and configured to provide access to a rearward portion of the hand-held electronic scanner;
- wherein each of said downwardly-extending sidewalls has an arcuate and inwardly-curved lower portion that defines a respective lower edge, wherein said lower edges of said downwardly-extending sidewalls cooperate to define at least a portion of said lower open region;
- at least one scanner-engaging projection extending into said scanner cavity from each of said arcuate interior surfaces of said downwardly-extending walls, wherein said scanner-engaging projection are configured to engage outer surfaces of the head portion of the hand-held electronic scanner.

17. The mount of claim 16, wherein said body comprises first and second body portions, said first body portion comprising a first of said upstanding sidewalls, a first of said downwardly-extending sidewalls, and a first of said opposite side portions of said base wall, and said second body portion comprising a second of said upstanding sidewalls, a second of said downwardly-extending sidewalls, and a second of said opposite side portions of said base wall, and wherein said first and second opposite side portions of said base wall comprise respective middle edge portions configured for engagement with one another.

18. The mount of claim 17, wherein said middle edge portion of said first side portion of said base wall comprises an elongate ledge spaced below said upper surface, and said middle edge portion of said second side portion of said base wall comprises an inwardly-projecting wall configured to engage said elongate ledge.

19. The mount of claim 16, wherein said lower open region and at least one of said forward open region and said rearward open region cooperate to form a contiguous opening to said scanner cavity.

20. The mount of claim 19, wherein said lower open region and said forward open region cooperate to form said contiguous opening to said scanner cavity, and wherein each of said downwardly-extending sidewalls has an arcuate and inwardly-curved rear portion that defines a respective rear edge, wherein said rear edges of said downwardly-extending sidewalls are in abutment at a rear end portion of said attachment portion and cooperate to form a portion of said rearward open region.

* * * * *